US012643787B2

(12) United States Patent
Seo et al.

(10) Patent No.: US 12,643,787 B2
(45) Date of Patent: Jun. 2, 2026

(54) LOW-TEMPERATURE DEHYDROGENATION METHOD AND HYDROGEN PRODUCTION SYSTEM USING THE SAME

(71) Applicants: HYUNDAI MOTOR COMPANY, Seoul (KR); KIA CORPORATION, Seoul (KR); KOREA RESEARCH INSTITUTE OF CHEMICAL TECHNOLOGY, Daejeon (KR)

(72) Inventors: Jihui Seo, Ulsan (KR); Jaeyong Lee, Seongnam-si (KR); Pyung Soon Kim, Suwon-si (KR); Jin Woo Choung, Suwon-si (KR); Yongwoo Kim, Gunpo-si (KR); Ji Hoon Park, Daejeon (KR); Soo Min Kim, Daejeon (KR); Jeong Jae Lee, Daejeon (KR); Kwanyong Jeong, Daejeon (KR)

(73) Assignees: HYUNDAI MOTOR COMPANY, Seoul (KR); KIA CORPORATION, Seoul (KR); KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 704 days.

(21) Appl. No.: 17/982,258

(22) Filed: Nov. 7, 2022

(65) Prior Publication Data

US 2023/0294981 A1 Sep. 21, 2023

(30) Foreign Application Priority Data

Mar. 15, 2022 (KR) ........................ 10-2022-0031799

(51) Int. Cl.
*C01B 3/00* (2026.01)
*B01J 19/00* (2006.01)
(Continued)

(52) U.S. Cl.
CPC ......... *C01B 3/0015* (2013.01); *B01J 19/0013* (2013.01); *B01J 19/24* (2013.01);
(Continued)

(58) Field of Classification Search
CPC .......... C01B 3/0015; C01B 2203/0277; C01B 2203/04; C01B 2203/066;
(Continued)

(56) References Cited

U.S. PATENT DOCUMENTS

2011/0020214 A1* 1/2011 Naeemi .................... B01J 23/42 422/198
2018/0169623 A1* 6/2018 Weiss ........................ B01J 29/76
2022/0024758 A1* 1/2022 Milstein ................ C01B 3/0015

FOREIGN PATENT DOCUMENTS

JP H08510447 A * 11/1996 ........... C07D 213/08

OTHER PUBLICATIONS

M. Niermann et al., Liquid organic hydrogen carriers (LOHCs)—techno-economic analysis of LOHCs in a defined process chain; Energy Environ. Sci.; vol. 12; 2019; 18 pp.

* cited by examiner

*Primary Examiner* — Kaity V Chandler
(74) *Attorney, Agent, or Firm* — Lempia Summerfield Katz LLC

(57) ABSTRACT

A low-temperature dehydrogenation method includes a dehydrogenation reaction of a reactant including a piperidine-based compound substituted with one or more alkyl groups. The dehydrogenation reaction takes place in the presence of a catalyst including an active metal. The active metal includes platinum (Pt), palladium (Pd), or a mixture thereof that is supported on a carrier including a composite metal oxide having alumina ($Al_2O_3$) and an additional metal
(Continued)

oxide different from alumina, at a low temperature of 150° C. to 250° C., to produce hydrogen.

13 Claims, 19 Drawing Sheets

(51) Int. Cl.

| | |
|---|---|
| ***B01J 19/24*** | (2006.01) |
| ***B01J 21/04*** | (2006.01) |
| ***B01J 21/06*** | (2006.01) |
| ***B01J 23/02*** | (2006.01) |
| ***B01J 23/10*** | (2006.01) |
| ***B01J 23/44*** | (2006.01) |
| ***C01B 3/0015*** | (2026.01) |
| ***H01M 8/0612*** | (2016.01) |

(52) U.S. Cl.
CPC ............ *B01J 21/04* (2013.01); *B01J 21/066* (2013.01); *B01J 23/02* (2013.01); *B01J 23/10* (2013.01); *B01J 23/44* (2013.01); *H01M 8/0625* (2013.01); *B01J 2219/00051* (2013.01)

(58) Field of Classification Search
CPC ....... C01B 2203/0811; C01B 2203/085; C01B 2203/1064; C01B 2203/1082; C01B 2203/1211; C01B 3/22; C01B 2203/107; C01B 3/0031; B01J 19/0013; B01J 19/24; B01J 21/04; B01J 21/066; B01J 23/02; B01J 23/10; B01J 23/44; B01J 2219/00051; B01J 23/40; H01M 8/0625; H01M 8/0612; H01M 8/06
See application file for complete search history.

LOW-TEMPERATURE DEHYDROGENATION METHOD AND HYDROGEN PRODUCTION SYSTEM USING THE SAME

CROSS-REFERENCE TO RELATED APPLICATION

This application claims priority to and the benefit of Korean Patent Application No. 10-2022-0031799 filed in the Korean Intellectual Property Office on Mar. 15, 2022, the entire contents of which are incorporated herein by reference.

BACKGROUND

(a) Technical Field

The present disclosure relates to a dehydrogenation method for producing hydrogen by dehydrogenating a chemical hydride, for example, a liquid organic hydrogen carrier (LOHC) at a low temperature, and to a hydrogen production system using the same.

(b) Description of the Related Art

Due to the depletion of fossil energy and environmental problems, renewable alternative energy is in great demand. Hydrogen is attracting attention as one of such alternative energy.

The hydrogen is used as a reaction gas in fuel cells and hydrogen burners. In order to apply the fuel cells and the hydrogen burners, (e.g., to automobiles, various electronic products, or the like), technology for stably and continuously supplying the hydrogen is required.

A method of receiving hydrogen from a hydrogen supply station may be adopted and separately installed for supplying the hydrogen to devices using hydrogen whenever the hydrogen is needed. In this method, compressed hydrogen or liquid hydrogen may be used for hydrogen storage.

Alternatively, a method of supply hydrogen to devices may be adopted using the hydrogen after loading a material storing and producing the hydrogen in the devices using the hydrogen and producing the hydrogen through a reaction of the corresponding material. This method may include, for example, a liquid organic hydrogen carrier (LOHC)-using method, an adsorption/desorption/carbon (absorbents/carbon)-using method, a chemical method (chemical hydrogen storage), and the like.

However, liquid organic hydrogen carriers in general have a dehydrogenation reaction at greater than or equal to 300° C. and thus low energy efficiency. For example, commercially available liquid organic hydrogen carriers, methylcyclohexane (MCH), have high reaction enthalpy of 9.5 kWh/kg $H_2$, which results in reducing energy efficiency by 28.5% and requires a high reaction temperature of greater than or equal to 280° C.

SUMMARY

One aspect of the present disclosure is to provide a low-temperature dehydrogenation method capable of improving the low-temperature dehydrogenation performance of liquid organic hydrogen carriers. A hydrogen production amount is thereby improved at a low temperature to improve an energy efficiency and output of the hydrogen production system. Another aspect of the present disclosure is to provide such a method also capable of rapid hydrogen extraction at a low temperature to improve a volumetric storage capacity.

According to one aspect, a low-temperature dehydrogenation method includes a dehydrogenation reaction of a reactant including a piperidine-based compound substituted with one or more alkyl groups. The dehydrogenation reaction takes place in the presence of a catalyst including an active metal. The active metal may include platinum (Pt), palladium (Pd), or a mixture thereof that is supported on a composite metal oxide carrier including a composite metal oxide having alumina ($Al_2O_3$) and an additional metal oxide different from alumina at a low temperature of 150° C. to 250° C., to produce hydrogen.

The piperidine-based compound may include 2-methylpiperidine, 3-methylpiperidine, 4-methylpiperidine, 3,4-dimethylpiperidine, 2,4-dimethylpiperidine, 2,5-dimethylpiperidine, 2,6-dimethylpiperidine, 3,5-dimethylpiperidine, or a mixture thereof.

The additional metal oxide different from alumina may include $Pr_2O_3$, MgO, $ZrO_2$, $CeO_2$, $La_2O_3$, $SiO_2$, or a mixture thereof.

The composite metal oxide carrier may include 1 wt. % to 50 wt. % of the composite metal oxide based on the total weight of the composite metal oxide carrier.

The catalyst may include an active metal in a range of 0.1 wt. % to 5.0 wt. % based on the total weight of the catalyst.

The catalyst may include Pd/$Pr_2O_3$—$Al_2O_3$, Pd/MgO—$Al_2O_3$, Pd/$ZrO_2$—$Al_2O_3$, Pd/$CeO_2$—$Al_2O_3$, Pd/$La_2O_3$—$Al_2O_3$, Pd/$SiO_2$—$Al_2O_3$, Pt/$Pr_2O_3$—$Al_2O_3$, Pt/MgO—$Al_2O_3$, Pt/$ZrO_2$—$Al_2O_3$, Pt/$CeO_2$—$Al_2O_3$, Pt/$La_2O_3$—$Al_2O_3$, Pt/$SiO_2$—$Al_2O_3$, or a mixture thereof.

The catalyst may be present in a range of 0.3 moles to 10 moles of the active metal of the catalyst based on 100 moles of the reactant.

The piperidine-based compound may be 2-methylpiperidine, the catalyst is Pd/$Pr_2O_3$—$Al_2O_3$, and the composite metal oxide carrier may include 1 wt. % to 20 wt. % of the composite metal oxide based on the total weight of the composite metal oxide carrier, and the catalyst may include 0.1 wt. % to 5.0 wt. % of the active metal based on the total weight of the catalyst.

The piperidine-based compound may be 2,6-dimethylpiperidine, the catalyst may be Pt/$CeO_2$—$Al_2O_3$, and the composite metal oxide carrier may include 1 wt. % to 20 wt. % of the composite metal oxide based on the total weight of the composite metal oxide carrier, and the catalyst may include 1.0 wt. % to 5.0 wt. % of the active metal based on the total weight of the catalyst.

In the low-temperature dehydrogenation method, the dehydrogenation reaction may be performed after mixing a piperidine-based compound and an acid.

The acid may include sulfuric acid, nitric acid, phosphoric acid, hydrochloric acid, boric acid, heteropoly acid, acetic acid, formic acid, malic acid, citric acid, tartaric acid, ascorbic acid, lactic acid, oxalic acid, succinic acid, tauric acid, or a mixture thereof.

The acid may be mixed in a range of 0.001 moles to 1 mole based on 1 mole of the piperidine-based compound.

According to another aspect, a hydrogen production system includes a reactant tank including a piperidine-based compound substituted with one or more alkyl groups, and a dehydrogenation reactor including a catalyst including an active metal including platinum (Pt), palladium (Pd), or a mixture thereof that is supported on a composite metal oxide carrier including a composite metal oxide having alumina ($Al_2O_3$) and an additional metal oxide different from alumina. The dehydrogenation reactor is configured to receive the piperidine-based compound from the reactant tank and performs a dehydrogenation reaction at a temperature in a range of 150° C. to 250° C. in the presence of the catalyst to produce hydrogen.

The liquid piperidine-based compound stored in the reactant tank may be injected into the dehydrogenation reactor in a liquid phase through an injector.

The liquid piperidine-based compound stored in the reactant tank may be injected into the dehydrogenation reactor as a gas phase through a vaporizer.

The hydrogen production system may further include an acid storage tank containing an acid.

The hydrogen production system may further include a heat source configured to supply heat to the dehydrogenation reactor.

The hydrogen production system may further include a buffer tank configured to store hydrogen produced from the dehydrogenation reactor.

The hydrogen production system may further include a fuel cell stack configured to generate electricity and water by receiving hydrogen and oxygen produced in the dehydrogenation reactor.

The low-temperature dehydrogenation method according to one aspect may improve the low-temperature dehydrogenation performance of liquid organic hydrogen carriers. A hydrogen production amount is thereby improved at a low temperature to improve an energy efficiency and output of the hydrogen production system. The low-temperature dehydrogenation method may also be capable of rapid hydrogen extraction at a low temperature to improve a volumetric storage capacity.

DETAILED DESCRIPTION

Figure 1:
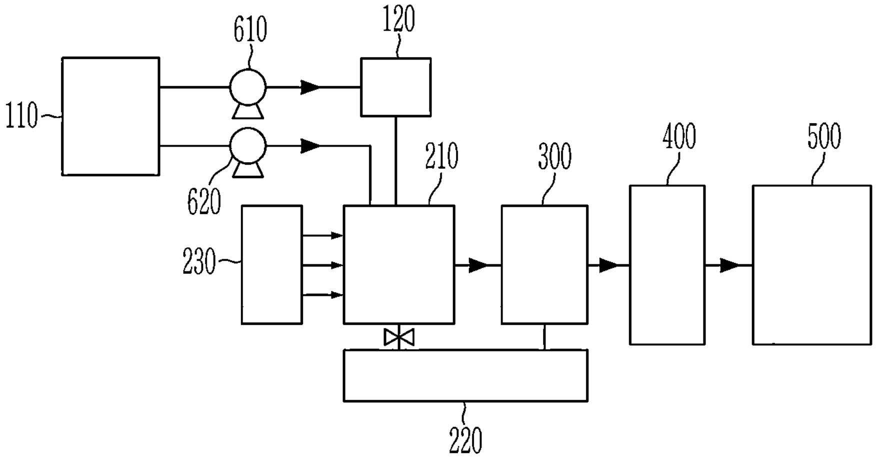
FIG. 1 is a view schematically illustrating a hydrogen production system according to one aspect.

Advantages and characteristics of this disclosure, and methods for achieving the same, should become evident referring to the following example embodiments. However, the embodiments should not be construed as being limited to the embodiments set forth herein. Unless otherwise defined, all terms (including technical and scientific terms) used herein have the same meaning as commonly understood by one of ordinary skill in the art. In addition, terms defined in a commonly used dictionary are not to be ideally or excessively interpreted unless explicitly defined.

In addition, unless explicitly described to the contrary, the words "comprise," "include," and "have" and variations such as "comprises" or "comprising," should be understood to imply the inclusion of stated elements but not the exclusion of any other elements. Further, the singular includes the plural unless mentioned otherwise.

In the low-temperature dehydrogenation method according to an aspect, a reactant including a piperidine-based compound is subjected to a dehydrogenation reaction at a low temperature in the presence of a catalyst to produce hydrogen.

The piperidine-based compound may be substituted with one or more alkyl groups, and for example, the alkyl group may be alkyl group having 1 to 10 carbon atoms, or a methyl group.

For example, the piperidine-based compound substituted with one or more alkyl groups may be 2-methylpiperidine, 3-methylpiperidine, 4-methylpiperidine, 3,4-dimethylpiperidine, 2,4-dimethyl piperidine, 2,5-dimethylpiperidine, 2,6-dimethylpiperidine, 3,5-dimethylpiperidine, or a mixture thereof, or for example 2-methylpiperidine or 2,6-dimethylpiperidine.

The catalyst may include an active metal supported on a composite metal oxide carrier.

The composite metal oxide carrier includes a composite metal oxide having alumina ($Al_2O_3$) and an additional metal oxide different from alumina.

The alumina may include θ-$Al_2O_3$, γ-$Al_2O_3$, α-$Al_2O_3$, η-$Al_2O_3$, δ-$Al_2O_3$, κ-$Al_2O_3$, or a mixture thereof. The metal oxides may include $Pr_2O_3$, MgO, $ZrO_2$, $CeO_2$, $La_2O_3$, $SiO_2$, or a mixture thereof. For example, the composite metal oxide carrier may include a composite metal oxide such as $Pr_2O_3$—$Al_2O_3$, MgO—$Al_2O_3$, $ZrO_2$—$Al_2O_3$, $CeO_2$—$Al_2O_3$, $La_2O_3$—$Al_2O_3$, $SiO_2$—$Al_2O_3$, or a mixture thereof.

The composite metal oxide carrier may include 1 wt. % to 50 wt. %, for 1 wt. % to 20 wt. % of the composite metal oxide based on the total weight of the composite metal oxide carrier. When the content of the metal oxide is less than 1 wt. %, a role of the added metal oxide may not be sufficiently exhibited. When the content of the metal oxide exceeds 50 wt. %, a specific surface area and pore size of the composite metal oxide may be reduced.

The composite metal oxide carrier may have a binary pore size distribution including both mesopores having an average pore size in a range of 5 nanometers (nm) to 100 nm and macropores having an average pore size in a range of 0.1 micrometers (μm) to 20 μm. Due to these dual pore size distribution characteristics, the catalyst may have improved activity and reproducibility in the dehydrogenation reaction upon reaction. If the size of the pores of the carrier is less than 5 nm, the mass transfer rate may decrease. If the pores of the carrier exceed 20 μm, the strength of the carrier may decrease. In other words, when the pore size is in a range of 10 nm to 1000 nm, it has transition diffusion and when the pore size is 1000 nm or more, it has bulk diffusion. Therefore, in the case of having macropores of greater than or equal to 1 μm, the mass transfer rate may be 20 times higher than that of the case of having pores of 10 nm.

The composite metal oxide carrier may have a specific surface area in a range of 55 $m^2/g$ to 250 $m^2/g$. If the specific surface area of the carrier is less than 55 $m^2/g$, dispersibility of the active metal and auxiliary metal may be low, and if it exceeds 250 $m^2/g$, side reactivity may increase due to a decrease in the particle size of the active metal.

The composite metal oxide carrier may have a strength in a range of 20 N to 50 N. By increasing the strength of the carrier, the catalyst may be prevented from being crushed even during regeneration or circulation of the catalyst. If the strength of the carrier is less than 20 N, the carrier may be easily broken. Thus, may be difficult to apply to a continuous reaction system, and thermal cracking may occur during the regeneration process. In addition, in the dehydrogenation reaction, friction or impact may be applied during transport under the condition that the catalyst is circulated and operated. In the case of using a carrier that is weak to impact, a high strength may impart a great advantage to the operation of the process because the carrier obstructs a flow of the product and increases the pressure in the reactor to lower a conversion rate of the catalyst.

The active metal is a component that has an activity contributing to the improvement of the hydrogen production amount during the dehydrogenation reaction of the piperidine-based compound. The active metal is supported on the carrier. For example, the active metal may include platinum (Pt), palladium (Pd), or a mixture thereof.

For example, the active metal may further include rhodium (Rh), ruthenium (Ru), iridium (Ir), osmium (Os), tin (Sn), zinc (Zn), manganese (Mn), rhenium (Re), yttrium (Y), magnesium (Mg), vanadium (V), cerium (Ce), lanthanum (La), samarium (Sm), gadolinium (Gd), sodium (Na), potassium (K), cesium (Cs), rubidium (Rb), nickel (Ni), cobalt (Co), iron (Fe), chromium (Cr), copper (Cu), or a mixture thereof.

The catalyst may include the active metal in a range of 0.1 wt. % to 5.0 wt. %, for example, 0.5 wt. % to 5.0 wt. % based on the total weight of the catalyst. If the amount of the active metal is less than 0.1 wt. %, the amount of the active metal supported in the catalyst may decrease activity of the catalyst, and if it exceeds 5.0 wt. %, a dispersion degree of the active metal may decrease.

For example, the catalyst may be Pd/$Pr_2O_3$—$Al_2O_3$, Pd/MgO—$Al_2O_3$, Pd/$ZrO_2$—$Al_2O_3$, Pd/$CeO_2$—$Al_2O_3$, Pd/$La_2O_3$—$Al_2O_3$, Pd/$SiO_2$—$Al_2O_3$, Pt/$Pr_2O_3$—$Al_2O_3$, Pt/MgO—$Al_2O_3$, Pt/$ZrO_2$—$Al_2O_3$, Pt/$CeO_2$—$Al_2O_3$, Pt/$La_2O_3$—$Al_2O_3$, Pt/$SiO_2$—$Al_2O_3$, or a mixture thereof, or for example Pd/$Pr_2O_3$—$Al_2O_3$ or Pt/$CeO_2$—$Al_2O_3$.

The catalyst may include the active metal in a range of 0.3 moles to 10 moles or 0.5 moles to 2 moles based on 100 moles of the reactant. When the active metal of the catalyst is included in less than 0.3 moles based on 100 moles of the reactant, the amount of the active metal compared to the reactant is remarkably small. Thus, the reaction rate may be reduced. When active metal is included in excess of 10 moles, the total amount of the catalyst on which the active metal is supported relative to the reactant is excessive. Thus, the viscosity of the mixture increases, and it may be difficult to operate the reactor.

For example, when the piperidine-based compound is 2-methylpiperidine, the catalyst may be Pd/$Pr_2O_3$—$Al_2O_3$. In this case, the composite metal oxide carrier may include the composite metal oxide in a range of 1 wt. % to 50 wt. %, (for example, 1 wt. % to 20 wt. %, or 5 wt. % to 20 wt. %), based on the total weight of the composite metal oxide carrier. The catalyst may include the active metal in a range of 0.1 wt. % to 5 wt. % or 1.0 wt. % to 5 wt. % based on the total weight of the catalyst.

For example, when the piperidine-based compound is 2,6-dimethylpiperidine, the catalyst may be Pt/$CeO_2$—$Al_2O_3$. In this case, the composite metal oxide carrier may include the composite metal oxide in a range of 1 wt. % to 50 wt. %, (for example, 1 wt. % to 20 wt. %, or 5 wt. % to 20 wt. %), based on the total weight of the composite metal oxide carrier. The catalyst may include the active metal in a range of 1.0 wt. % to 5 wt. % based on the total weight of the catalyst.

In the low-temperature dehydrogenation method, the piperidine-based compound and the acid may be mixed, followed by a dehydrogenation reaction. When the piperidine-based compound and the acid are mixed, the hydrogen production amount and volume storage amount at the initial stage of the reaction may be improved.

The acid may include sulfuric acid, nitric acid, phosphoric acid, hydrochloric acid, boric acid, heteropoly acid, acetic acid, formic acid, malic acid, citric acid, tartaric acid, ascorbic acid, lactic acid, oxalic acid, succinic acid, tauric acid, or a mixture thereof, and for example, the acid may be formic acid.

The acid may be mixed in a range of 0.001 moles to 1 mole, for example, 0.01 moles to 0.5 moles, based on 1 mole of the piperidine-based compound. When the content of the acid is less than 0.01 moles, the effect obtained by the addition of the acid may not be sufficiently exhibited, and when it exceeds 1 mole, stirring becomes difficult due to salt formation and excess acid may corrode the elements of the reaction system.

The dehydrogenation reaction may be performed at a relatively low temperature, i.e., a temperature in a range of 150° C. to 250° C. or 170° C. to 200° C. When the reaction temperature is less than 150° C., the energy required for the reaction may not be properly supplied. Thus, the reaction rate and yield may be lowered. When the reaction temperature exceeds 250° C., unwanted side reactions may occur.

The dehydrogenation reaction may be performed at a pressure in a range of 1 bar to 5 bar or 3 bar to 5 bar. When the reaction pressure is less than 1 bar, a boiling point of the reactants is lower than the reaction temperature at the corresponding pressure so that all of the reactants may be vaporized. When the reaction pressure exceeds 5 bar, a reverse hydrogenation reaction may be activated due to the high pressure considering that the two reactions are reversible reactions producing gas.

FIG. 1 is a view schematically illustrating a hydrogen production system according to a low-temperature dehydrogenation method. Hereinafter, a hydrogen production system is described in detail with reference to FIG. 1.

Referring to FIG. 1, the hydrogen production system includes a reactant tank 110 and a dehydrogenation reactor 210.

The reactant tank 110 includes, for example, a liquid organic hydrogen carrier (LOHC).

The liquid organic hydrogen carrier may be a piperidine-based compound, and because they are the same as described above, repetitive descriptions thereof have been omitted.

The reactant tank 110 supplies a liquid organic hydrogen carrier to the dehydrogenation reactor 210. Pumps 610 and 620 for supplying a liquid organic hydrogen carrier to the dehydrogenation reactor 210 may be included between the reactant tank 110 and the dehydrogenation reactor 210.

When the liquid phase reaction proceeds in the dehydrogenation reactor 210, the reactant may be injected into the dehydrogenation reactor 210 in a liquid phase through an injector and, after being preheated, the reactant is injected into the dehydrogenation reactor 210. In addition, a pressure regulator may further be included for injecting the liquid reactant into the dehydrogenation reactor 210.

Alternatively, when the gas phase reaction is performed in the dehydrogenation reactor 210, the liquid organic hydrogen carrier may be vaporized through the vaporizer 120 and then supplied to the dehydrogenation reactor 210. At this time, a hydrogen separation trap or filter may be further included between the vaporizer 120 and the dehydrogenation reactor 210.

In addition, in the dehydrogenation reactor 210, the gas phase reaction and the liquid phase reaction may proceed, respectively, and the system may be separately manufactured.

The dehydrogenation reactor 210 produces hydrogen by a dehydrogenation reaction of the liquid organic hydrogen carrier. The dehydrogenation reaction may be performed in the presence of a catalyst, and the dehydrogenation reactor 210 may include the catalyst described above therein.

The hydrogen production system may further include a heat source 230 configured to supply heat to the dehydrogenation reactor 210 as needed.

A type of the heat source 230 is not particularly limited but may include a hydrogen burner, an electrical-heating device having a heating wire and the like, an electric heater, and the like. In addition, heat generated from an exothermic power generator such as the fuel cell stack 500 using hydrogen produced in the dehydrogenation reactor 210 or a hydrogen engine, etc. may be used.

Furthermore, the hydrogen production system may further include a heat exchange device (not shown) for heat recovery.

In the dehydrogenation reactor 210, when the dehydrogenation reaction is a liquid phase reaction, the hydrogen production system may further include a product tank 220 for separating hydrogen and dehydrogenated chemical hydride from the reactant produced in the dehydrogenation reactor 210.

Alternatively, in the dehydrogenation reactor 210, when the dehydrogenation reaction is a gaseous reaction, the hydrogen production system may further include a hydrogen separator 300 for separating hydrogen and dehydrogenated hydride from the reactant produced in the dehydrogenation reactor 210.

For example, the organic hydrogen carriers reacting in a gaseous state may go through the hydrogen separator 300 to separate produced hydrogen and the dehydrogenated organic hydrogen carriers. However, the organic hydrogen carriers reacting in a liquid state reaction may not go through the hydrogen separator 300.

The hydrogen produced from the dehydrogenation reactor 210 is transferred to a buffer tank 400. The buffer tank 400 receives and stores a predetermined amount of hydrogen gas.

The fuel cell stack 500 is located downstream of the buffer tank 400 and supplied with hydrogen gas from the buffer tank 400. For example, the fuel cell stack 500 receives the hydrogen gas through an intake port such as a valve and the like from the buffer tank 400.

The fuel cell stack 500 reacts the supplied hydrogen with oxygen to produce water and simultaneously, generate electrical energy. The water produced in the fuel cell stack 500 is discharged, for example, through an exhaust such as a valve and the like.

The fuel cell stack 500 may be any device that converts hydrogen gas into usable electrical energy, for example, a proton exchange membrane fuel cell (PEMFC), an alkaline fuel cell (AFC), a phosphoric acid fuel cell (PAFC), a molten carbonate fuel cell (MCFC), or a solid oxide fuel cell (SOFC), but the present disclosure is not limited thereto.

For example, the fuel cell stack 500 may pass the generated electrical energy through a power converter such as a DC converter, an inverter, a charge controller, or the like. The power converter outputs a portion of electrical energy to an electrical load through a load interconnect. Another portion of the electrical energy may be sent back to the energy storage through a recharge interconnect. Still another portion of the electrical energy may be used to supply power to a control unit.

The hydrogen production system may further include, if necessary, an additional pump, a trap or filter for separating hydrogen, or both of them and in addition, further a control device for controlling the hydrogen production system.

The pumps 610 and 620 may be used to supply the liquid organic hydrogen carrier of the reactant tank 110 to the dehydrogenation reactor 210 as described above. In addition, an additional pump may be further included to supply the hydrogen gas produced in the dehydrogenation reactor 210 to the buffer tank 400 or the fuel cell stack 500.

The filter may filter the produced hydrogen gas to remove unwanted particles included in the hydrogen gas. The filter may be disposed between the dehydrogenation reactor 210, the hydrogen separator 300, the buffer tank 400, or the fuel cell stack 500. In one example, the filter may be disposed between the buffer tank 400 and the fuel cell stack 500.

The control device may be connected to a plurality of pumps, regulators, needle valves, check valves, ball valves, and multiple direction valves with a control line to control the operation.

Hereinafter, specific examples of the disclosure are provided. However, the examples described below are for illustrative purposes only, and the scope of the disclosure is not limited thereto.

Preparation Examples: Preparation of Catalyst for Dehydrogenation Reaction

Preparation Example 1: $Pd/Pr_2O_3—Al_2O_3$

A $Pr_2O_3—Al_2O_3$ composite metal oxide is prepared in a solvent-deficient precipitation method. Specifically, praseodymium(III) nitrate hexahydrate, which is a praseodymium oxide precursor, and aluminum nitrate nonahydrate, which is an alumina precursor, are prepared in a weight ratio of $Pr_2O_3:Al_2O_3$=20:80. Subsequently, 3 equivalents of ammonium bicarbonate based on a total amount of the two precursors is prepared.

Then, each material is put in a mortar and stirred by using a pestle at room temperature. Each precursor is dissolved by hydrated water, and $CO_2$ decomposed from the ammonium bicarbonate is produced. The stirring continues for 20 minutes, until the ammonium bicarbonate is all decomposed and stops producing $CO_2$. Subsequently, the $Pr_2O_3—Al_2O_3$ composite metal oxide is obtained by firing the resultant at 600° C. for 5 hours.

Palladium(II) nitrate hydrate ($Pd(NO_3)_2·xH_2O$) which is a Palladium (Pd)precursor is weighed to have a palladium content of 2 wt. % and dissolved in distilled water to prepare a precursor solution, and the $Pr_2O_3—Al_2O_3$ composite metal oxide in a powder state is added thereto and then, stirred therewith. The resultant is dried at 100° C. for 12 hours to evaporate water and support palladium on the $Pr_2O_3—Al_2O_3$ composite metal oxide.

Preparation Example 2: $Pd/CeO_2—Al_2O_3$

The $CeO_2—Al_2O_3$ composite metal oxide is prepared in the solvent-deficient precipitation method. Specifically, cerium(III) nitrate hexahydrate, which is a ceria precursor, and aluminum nitrate nonahydrate, which is an alumina precursor, are prepared in a weight ratio of $CeO_2:Al_2O_3$=10:90. Then, 3 equivalents of ammonium bicarbonate based on a total amount of the two precursors is prepared.

Subsequently, each material is put in a mortar and stirred by using a pestle at room temperature. Each precursor is dissolved by hydrated water, and $CO_2$ decomposed from the ammonium bicarbonate is produced. The stirring continues for 20 minutes, until the ammonium bicarbonate is all decomposed and stops producing $CO_2$. Subsequently, the $Pr_2O_3—Al_2O_3$ composite metal oxide is obtained by firing the resultant at 600° C. for 5 hours.

Palladium(II) nitrate hydrate ($Pd(NO_3)_2·xH_2O$) which is a palladium (Pd) precursor is weighed to have a palladium content of 1 wt. % and dissolved in distilled water to prepare a precursor solution, and the $CeO_2—Al_2O_3$ composite metal oxide in a powder state is added thereto and then, stirred therewith. The resultant is dried at 100° C. for 12 hours to evaporate water and support palladium on the $CeO_2—Al_2O_3$ composite metal oxide.

Experimental Example 1

Figure 2:
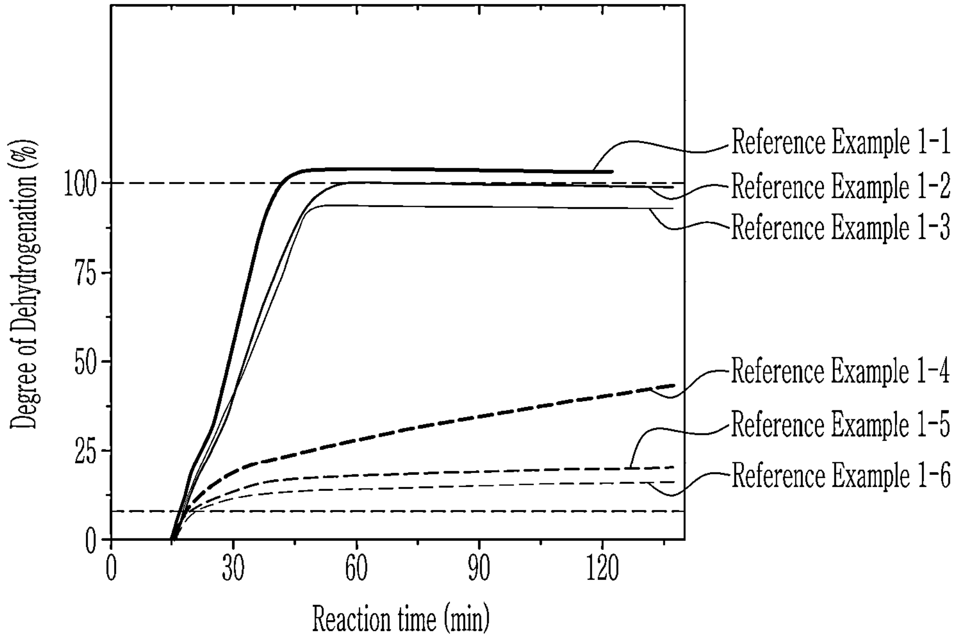
FIG. 2 is a graph showing the measurement results of the dehydrogenation activity of methylpiperidine according to the type of catalyst in Experimental Example 1.

The catalysts are measured with respect to dehydrogenation activity of methylpiperidine according to types of catalysts, and the results are shown in FIG. 2.

A dehydrogenation reaction is carried out by supplying 6 wt. % of the methylpiperidine at 51.5 g/L under a pressure of 3 bar at 200° C. in an amount of 1 mole of a metal of a catalyst based on 100 moles of the reactant.

Reference Example 1-1 uses 2-methylpiperidine as a reactant and $Pd/Al_2O_3$ as a catalyst, Reference Example 1-2 uses 3-methylpiperidine as a reactant and $Pd/Al_2O_3$ as a catalyst, Reference Example 1-3 uses 4-methylpiperidine as a reactant and $Pd/Al_2O_3$ as a catalyst, Reference Example 1-4 uses 2-methylpiperidine as a reactant and $Pt/Al_2O_3$ as a catalyst, Reference Example 1-5 uses 3-methylpiperidine as a reactant and $Pt/Al_2O_3$ as a catalyst, and Reference Example 1-6 uses 4-methylpiperidine as a reactant and $Pt/Al_2O_3$ as a catalyst.

In FIG. 2, Reference Example 1-1 exhibits dehydrogenation activity of 100%, Reference Example 1-2 exhibits dehydrogenation activity of 97.61%, Reference Example 1-3 exhibits dehydrogenation activity of 89.88%, Reference Example 1-4 exhibits dehydrogenation activity of 33.83%, Reference Example 1-5 exhibits dehydrogenation activity of 5.55%, and Reference Example 1-6 exhibits dehydrogenation activity of 3.36%.

Referring to FIG. 2, as a result of examining low temperature dehydrogenation activity of the methylpiperidine at 200° C., the $Pd/Al_2O_3$ catalysts turn out to secure almost 100% of activity. On the contrary, the $Pt/Al_2O_3$ catalysts exhibit very low activity.

Figure 3:
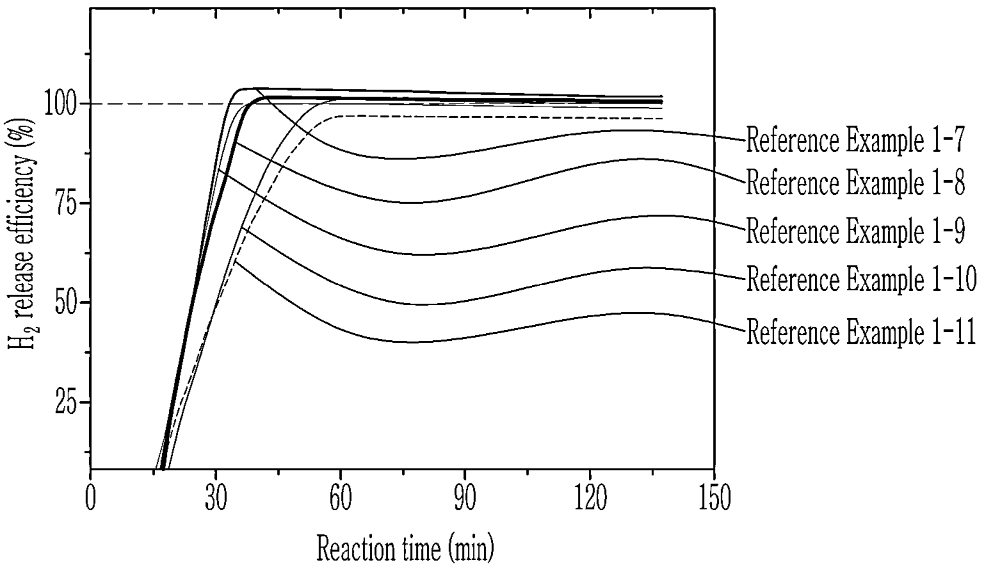
FIG. 3 is a graph showing the measurement results of the hydrogen release efficiency of dimethylpiperidine according to the type of catalyst in Experimental Example 1.

The hydrogen release efficiency of dimethylpiperidine according to the types of catalysts is measured, and the results are shown in FIG. 3.

The dehydrogenation reaction is carried out by supplying 5.3 wt. % of dimethylpiperidine at 43.8 g/L under a pressure of 3 bar at 200° C. in an amount of 1 mole of metal of a catalyst based on 100 moles of the reactant catalyst. The hydrogen release efficiency is calculated based on 41.592 mmol of produced $H_2$ as 100%.

Reference Example 1-7 uses 2,6-dimethylpiperidine as a reactant and $Pt/Al_2O_3$ (a content of Pt based on the total catalyst: 5 wt. %) as a catalyst. Reference Example 1-8 uses 2,6-dimethylpiperidine as a reactant and $Pd/Al_2O_3$ (a content of Pt based on the total catalyst: 5 wt. %) as a catalyst. Reference Example 1-9 uses 2,6-dimethylpiperidine as a reactant and $Pt/SiO_2$ (a content of Pt based on the total catalyst: 5 wt. %) as a catalyst. Reference Example 1-10 uses 2,6-dimethylpiperidine as a reactant and $Pd/SiO_2$ (a content of Pd based on the total catalyst) as a catalyst. Reference Example 1-11 uses 2,6-dimethylpiperidine as a reactant and Pd/C (a content of Pd based on the total catalyst) as a catalyst.

In FIG. 3, Reference Example 1-7 exhibits hydrogen release efficiency of 100%. Reference Example 1-8 exhibits hydrogen release efficiency of 99.0%. Reference Example 1-9 exhibits hydrogen release efficiency of 100%. Reference Example 1-10 exhibits hydrogen release efficiency of 100%. Reference Example 1-11 exhibits hydrogen release efficiency of 96.1%.

Referring to FIG. 3, when low temperature dehydrogenation activity of the dimethylpiperidine is examined at 200° C., unlike the methylpiperidine, the $Pt/Al_2O_3$ catalysts and the $Pd/Al_2O_3$ catalysts all exhibit dehydrogenation activity of greater than or equal to 95% at a low temperature of 200° C. However, considering a conversion rate and a reaction rate thereof, the $Pt/Al_2O_3$ catalysts exhibit a little more excellent performance.

Experimental Example 2

Figure 4:
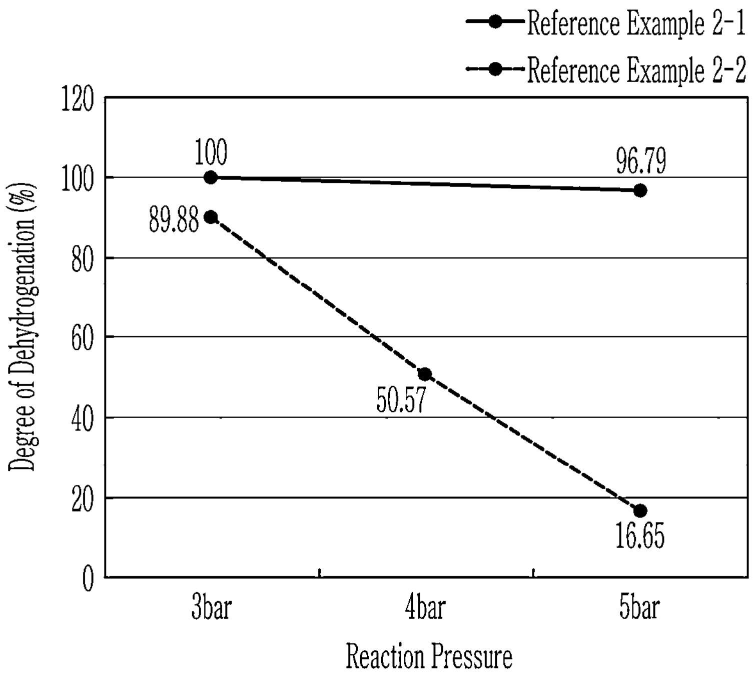
FIG. 4 is a graph showing the measurement results of dehydrogenation activity according to the position of the methyl group of methylpiperidine in Experimental Example 2.

Dehydrogenation activity according to a position of methyl group of methylpiperidine is measured, and the results are shown in FIG. 4.

A dehydrogenation reaction is carried out by supplying 6 wt. % of methylpiperidine at 51.5 g/L and by changing a pressure at 200° C. in an amount of 1 mole of metal of a catalyst based on 100 moles of the reactant catalyst.

Reference Example 2-1 uses 2-methylpiperidine as a reactant and $Pd/Al_2O_3$ as a catalyst, and Reference Example 2-2 uses 4-methylpiperidine as a reactant and $Pd/Al_2O_3$ as a catalyst.

In FIG. 4, when dehydrogenation activity of methylpiperidine is examined at a low temperature of 200° C., the $Pd/Al_2O_3$ catalysts exhibit almost 100% of activity. On the contrary, the $Pt/Al_2O_3$ catalysts exhibit very low activity.

Referring to FIG. 4, when dehydrogenation reaction characteristic differences according to a position of a methyl group are examined, unlike 2-methylpiperidine, which maintains activity of 97% under 5 bar, 4-methylpiperidine exhibits a sharp activity drop according to a pressure increase, which falls to 17%. Accordingly, under dehydrogenation condition of 4 bar to 5 bar, the 2-methylpiperidine may be appropriate.

Figure 5:
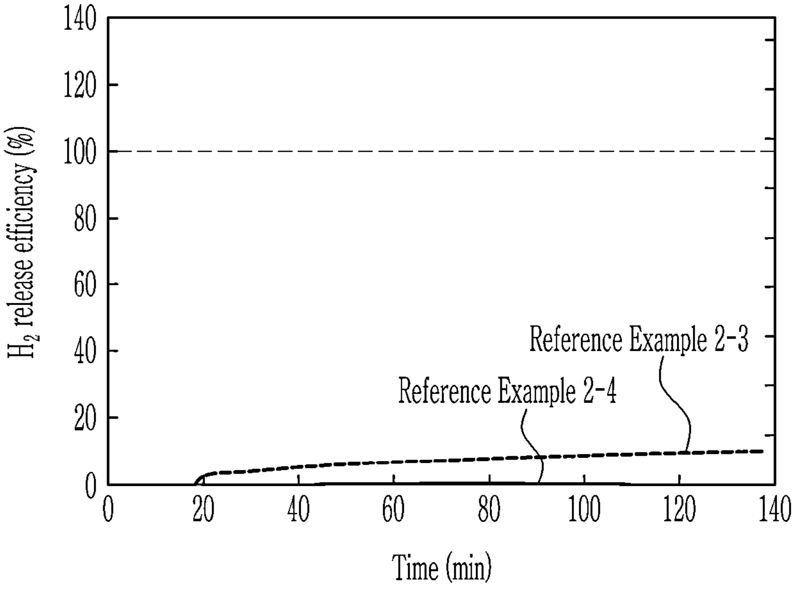
FIG. 5 is a graph showing the measurement results of hydrogen release efficiency according to the position of the methyl group of dimethylpiperidine in Experimental Example 2.

Hydrogen release efficiency is measured according to a position of a methyl group of dimethylpiperidine, and the results are shown in FIG. 5.

A dehydrogenation reaction is carried out by supplying 5.3 wt. % of dimethylpiperidine at 43.8 g/L under a pressure of 3 bar at 200° C. in an amount of 1 mole of metal of a catalyst based on 100 moles of the reactant catalyst. Hydrogen release efficiency is calculated based on 41.592 mmol of produced $H_2$ as 100%.

Reference Example 2-3 uses 3,5-dimethylpiperidine as a reactant and $Pd/Al_2O_3$ (a content of Pd based on the total catalyst) as a catalyst, Reference Example 2-4 uses 3,5-dimethylpiperidine as a reactant and Pd/C (a content of Pd based on the total catalyst) as a catalyst.

In FIG. 5, the hydrogen release efficiency of Reference Example 2-3 is 10.1%, and the hydrogen release efficiency of Reference Example 2-4 is 0.0%.

Referring to FIGS. 2 and 5, as a result of comparing dehydrogenation reactivity of 2,6-dimethylpiperidine and 3,5-dimethylpiperidine, the 2,6-dimethylpiperidine exhibits a conversion rate of almost 100%, and the 3,5-dimethylpiperidine has almost no reaction. Accordingly, the 2,6-dimethylpiperidine exhibits much more excellent activity under a low temperature dehydrogenation condition.

Experimental Example 3

Figure 6:
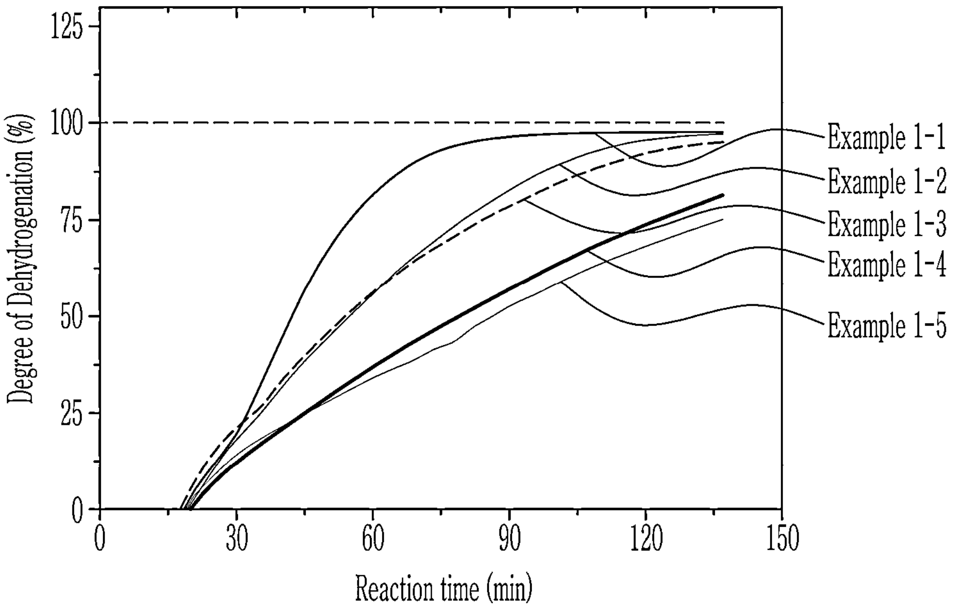
FIGS. 6 and 7 are graphs showing the measurement results of the dehydrogenation activity of methylpiperidine according to the type of the additional metal oxide of the catalyst in Example 3.
Figure 7:
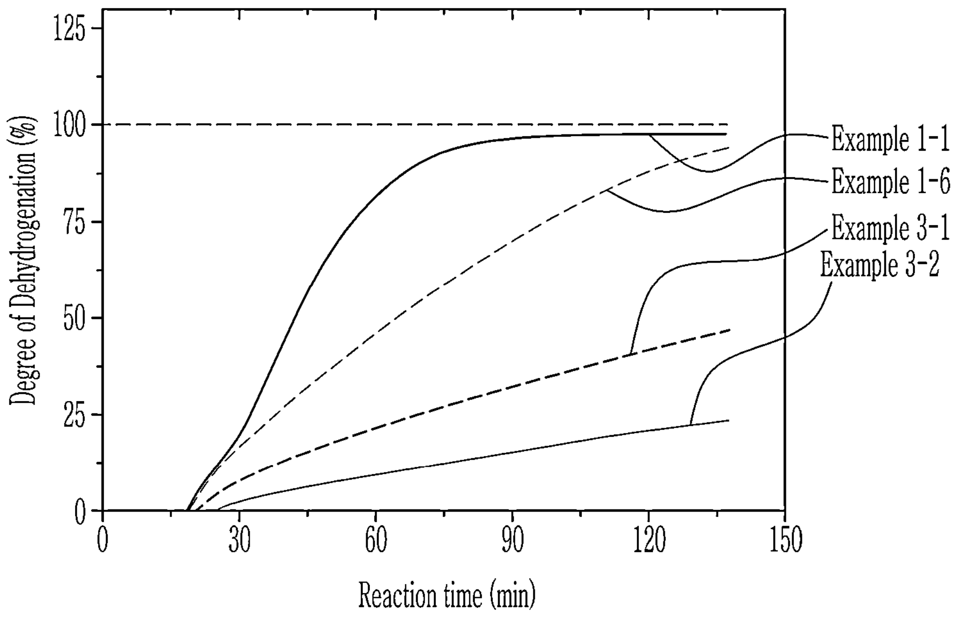

Dehydrogenation activity of methylpiperidine according to types of additional metal oxide of the catalyst is measured, and the results are shown in FIGS. 6 and 7.

A dehydrogenation reaction is carried out by supplying 6 wt. % of methylpiperidine at 51.5 g/L and changing pressure at 200° C. in an amount of 1 mole of metal of a catalyst based on 100 moles of the reactant catalyst.

Example 1-1 uses 2-methylpiperidine as a reactant and $Pd/Pr_2O_3$—$Al_2O_3$ (a content of Pd based on the catalyst: 2 wt. %, a content of $Pr_2O_3$ based on the total carrier: 20 wt. %) as a catalyst. Example 1-2 uses 2-methylpiperidine as a reactant and Pd/MgO—$Al_2O_3$ (a content of Pd based on the catalyst: 2 wt. %, a content of MgO based on the total carrier: 20 wt. %) as a catalyst. Example 1-3 uses 2-methylpiperidine as a reactant and $ZrO_2$—$Al_2O_3$ (a content of Pd based on the catalyst: 2 wt. %, a content of $ZrO_2$ based on the total carrier: 20 wt. %) as a catalyst. Example 1-4 uses 2-methylpiperidine as a reactant and $Pd/CeO_2$—$Al_2O_3$ (a content of Pd based on the catalyst: 2 wt. %, a content of $CeO_2$ based on the total carrier: 20 wt. %) as a catalyst. Example 1-5 uses 2-methylpiperidine as a reactant and $Pd/La_2O_3$—$Al_2O_3$ (a content of Pd based on the catalyst: 2 wt. %, a content of $La_2O_3$ based on the total carrier: 20 wt. %) as a catalyst. Example 1-6 uses 2-methylpiperidine as a reactant and Pd/MgO—$Al_2O_3$ (a content of Pd based on the catalyst: 2 wt. %, a content of MgO based on the total carrier: 50 wt. %) as a catalyst. Comparative Example 3-1 uses 2-methylpiperidine as a reactant and $Pd/Al_2O_3$ (a content of Pd based on the catalyst: 2 wt. %) as a catalyst. Comparative Example 3-2 uses 2-methylpiperidine as a reactant and $Pd/Pr_2O_3$ (a content of Pd based on the catalyst: 2 wt. %) as a catalyst.

Referring to FIGS. 6 and 7, in case of low temperature dehydrogenation of 2-methylpiperidine, high activity is shown in the order $Pr_2O_3$, MgO, $ZrO_2$, $CeO_2$, and $La_2O_3$ as an additional metal oxide of the $Pd/Al_2O_3$ catalyst. Particularly, when the addition amount of $Pr_2O_3$ is 20 wt. % based on a total amount of the carrier, a dehydrogenation conversion rate and a hydrogen production rate are significantly improved.

Figure 8:
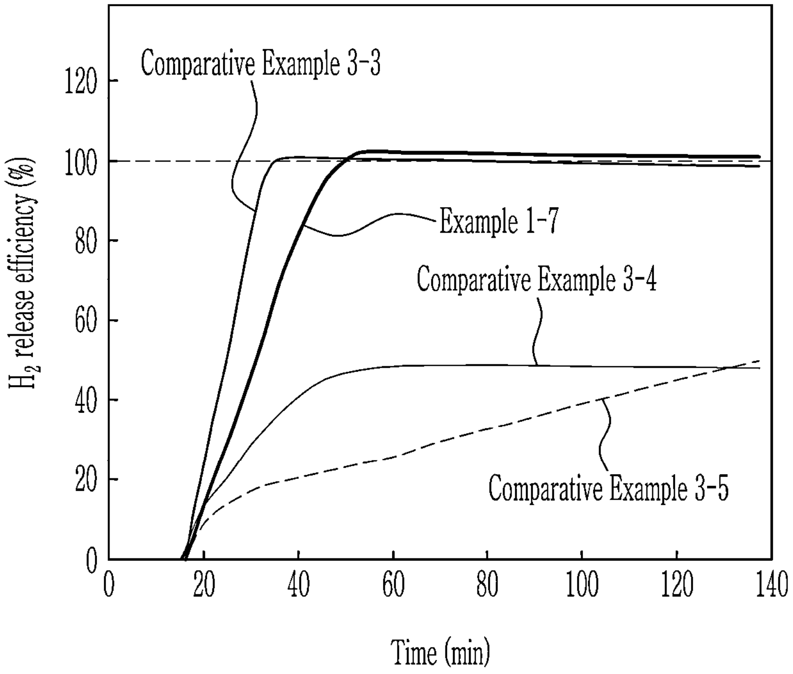
FIG. 8 is a graph showing the measurement results of hydrogen release efficiency of dimethylpiperidine according to the type of the additional metal oxide of the catalyst in Example 3.

Hydrogen release efficiency of dimethylpiperidine according to the types of the additional metal oxide of the catalyst is measured, and the results are shown in FIG. 8.

A dehydrogenation reaction is performed by supplying 5.3 wt. % of dimethylpiperidine at 43.8 g/L under a pressure of 3 bar at 200° C. in an amount of 1 mole of metal of a catalyst based on 100 moles of the reactant catalyst. The hydrogen release efficiency is calculated based on 41.592 mmol of produced $H_2$ as 100%.

Comparative Example 3-3 uses 2,6-dimethylpiperidine as a reactant and $Pt/Al_2O_3$ (a content of Pt based on the total catalyst: 5 wt. %) as a catalyst. Example 1-7 uses 2,6-dimethylpiperidine as a reactant and $Pt/CeO_2$—$Al_2O_3$ (a content of Pt based on the total catalyst: 1 wt. %, a content of $CeO_2$ based on the total carrier: 10 wt. %) as a catalyst. Comparative Example 3-4 uses 2,6-dimethylpiperidine as a reactant and $Pt/Al_2O_3$ (a content of Pt based on the total catalyst: 1 wt. %) as a catalyst. Comparative Example 3-5 uses 2,6-dimethylpiperidine as a reactant and $Pt/CeO_2$ (a content of Pt based on the total catalyst: 1 wt. %) as a catalyst.

In FIG. 8, the hydrogen release efficiency of Comparative Example 3-3 is 100%, the hydrogen release efficiency of Examples 1-7 is 100%, the hydrogen release efficiency of Comparative Example 3-4 is 47.9%, and the hydrogen release efficiency of Comparative Example 3-5 is 49.8%.

Referring to FIGS. 2 and 8, in case of the low temperature dehydrogenation of 2,6-dimethylpiperidine, Pt instead of Pd as an active metal exhibits higher activity, and higher activity is shown in the order of $Al_2O_3$, $SiO_2$, and carbon as a support. In addition, when 10 wt. % of $CeO_2$ is added to a $Pt/Al_2O_3$ catalyst, the $Pt/Al_2O_3$ catalyst has a low Pt content of 1 wt. % but exhibits similar activity to the $Pt/Al_2O_3$ catalyst having a Pt content of 5 wt. %.

Experimental Example 4

Figure 9:
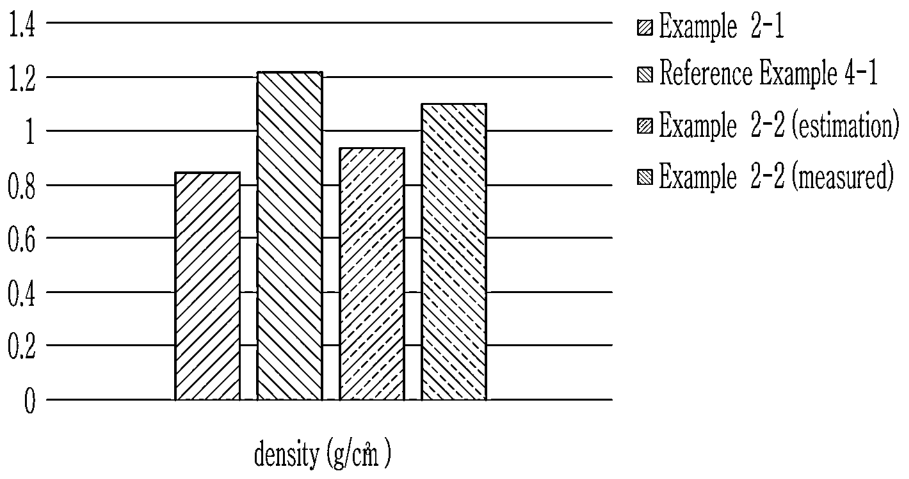
FIG. 9 is a graph showing the change in density of methylpiperidine before and after mixing formic acid in Example 4.
Figure 10:
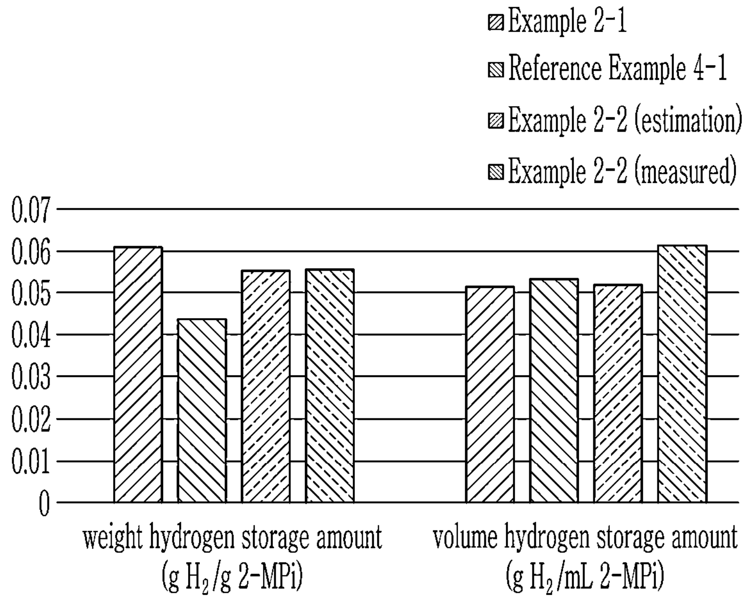
FIG. 10 is a graph showing the change in the hydrogen storage amount of methylpiperidine before and after mixing formic acid in Example 4.

Density changes of methylpiperidine before and after mixing with formic acid is measured, and the results are shown in FIG. 9. In addition, hydrogen storage amount changes of the methylpiperidine before and after mixing with formic acid are measured, and the results are shown in FIG. 10. In addition, the results are shown in Table 1.

Example 2-1 uses 10 mmol of 2-methylpiperidine as a reactant, Reference Example 4-1 uses formic acid (FA) as a reactant. Example 2-2 uses a mixture of 10 mmol of 2-methylpiperidine and 10 mmol of formic acid as a reactant.

TABLE 1

| | Example 2-1 | Reference Example 4-1 | Example 2-2 | Example 2-2 |
|---|---|---|---|---|
| Reactant | 2-methylpiperidine (2-MPi) | formic acid (FA) | 2-methylpiperidine formic acid (estimated value) | 2-methylpiperidine + formic acid (measurement value) |
| Mass (g) | 0.9918 | 0.4603 | 1.4521 | 1.0953 |
| Volume ($cm^3$) | 1.18 | 0.377 | 1.56 | 1.00 |
| Density ($g/cm^3$) | 0.844 | 1.22 | 0.931 | 1.10 |
| g hydrogen storage amount ($g H_2/g$ 2-MPi) | 0.06098 | 0.04380 | 0.05554 | 0.05554 |
| v hydrogen storage amount ($g H_2/mL$ 2-MPi) | 0.05147 | 0.05344 | 0.05195 | 0.06109 |

Referring to FIGS. 9 and 10 and Table 1, as a result of comparing density, a weight hydrogen storage amount, and a volume hydrogen storage amount before and after mixing 2-methylpiperidine with formic acid, comparing a predicted value of density with an actually measured value after mixing in case of simply physically mixing two materials, when two material are mixed, higher density is obtained than when conventionally used. Accordingly, the volume storage amount is much improved by mixing formic acid with 2-methylpiperidine.

Figure 11:
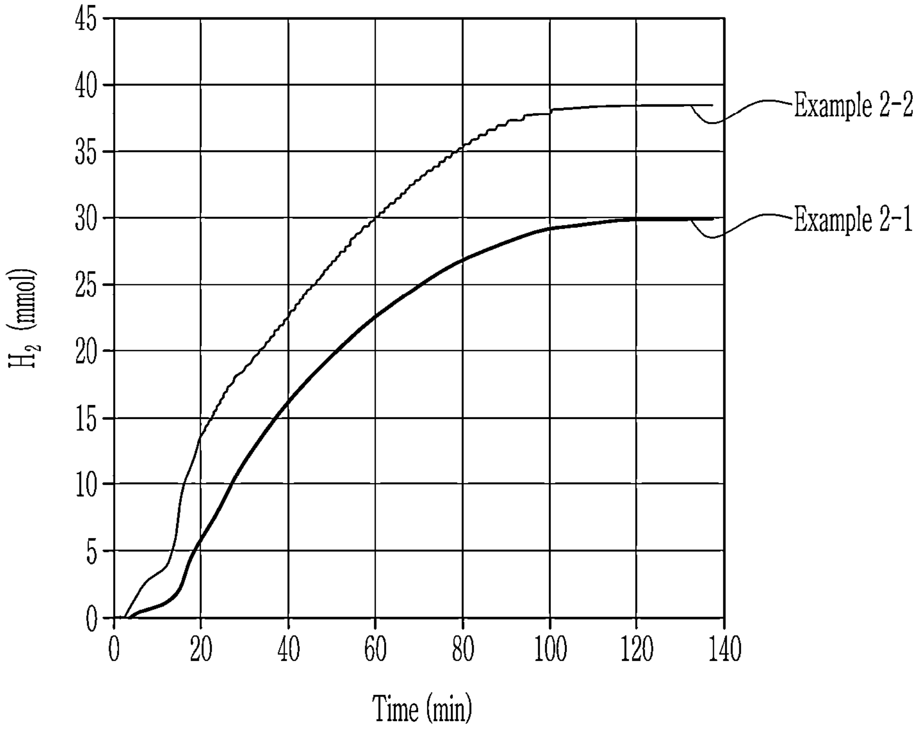
FIG. 11 is a graph showing the hydrogen production amount according to time of methylpiperidine before and after mixing formic acid in Example 4.
Figure 12:
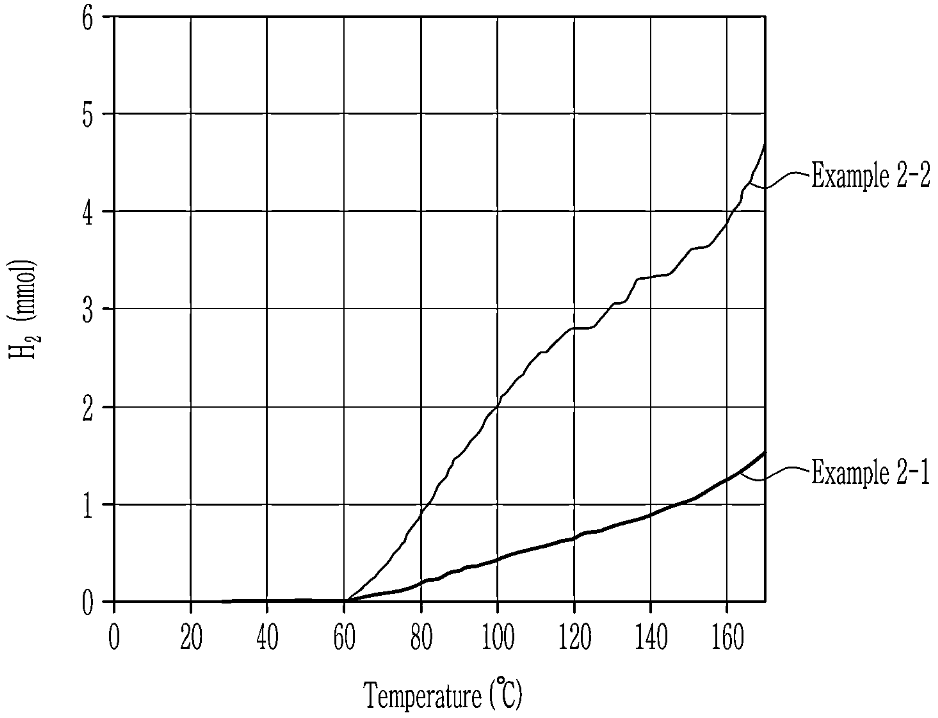
FIG. 12 is a graph showing the hydrogen production amount according to the temperature of methylpiperidine before and after mixing formic acid in Example 4.
Figure 13:
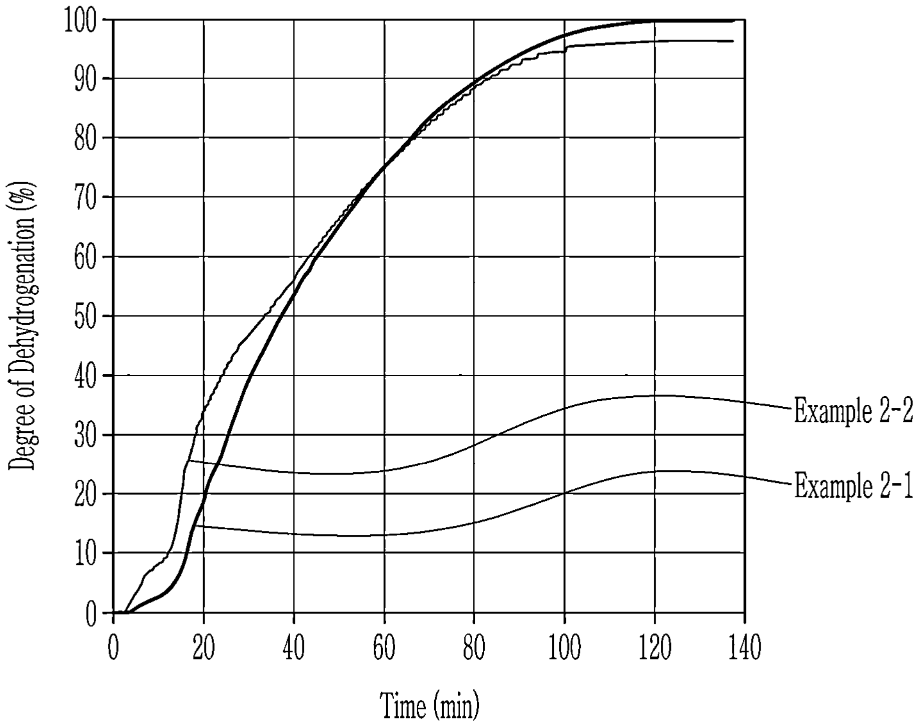
FIG. 13 is a graph showing the measurement results of the dehydrogenation activity of methylpiperidine before and after mixing formic acid in Example 4.

Hydrogen production amounts according to time and temperature of methylpiperidine before and after mixing with formic acid are measured, and the results are shown in FIGS. 11 and 12. In addition, dehydrogenation activity of methylpiperidine before and after mixing with formic acid is measured, and the results are shown in FIG. 13.

A dehydrogenation reaction is carried by supplying 6 wt. % of a reactant at 51.5 g/L and changing a pressure at 200° C. in an amount of 1 mol of metal of a catalyst based on 100 moles of the reactant catalyst.

Example 2-1 uses 10 mmol of 2-methylpiperidine as a reactant and $Pd/CeO_2—Al_2O_3$ (a content of Pd based on the total catalyst, a content of $CeO_2$ based on the total carrier: 20 wt. %) as a catalyst. Example 2-2 uses a mixture of 10 mmol of 2-methylpiperidine reactant and 10 mmol of formic acid and $Pd/CeO_2—Al_2O_3$ (a content of Pd based on the total catalyst, a content of $CeO_2$ based on the total carrier: 20 wt. %) as a catalyst.

In Example 2-1, the same reaction as in Reaction Scheme 1 proceeds, and 30 mmol of produced $H_2$ is a conversion rate of 100%. In Example 2-2, the same reaction as in Reaction Scheme 2 proceeds, and 40 mmol of produced $H_2$ is a conversion rate of 100%.

(1)

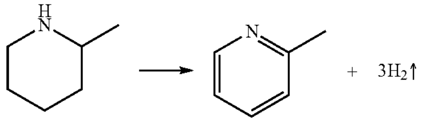

(2)

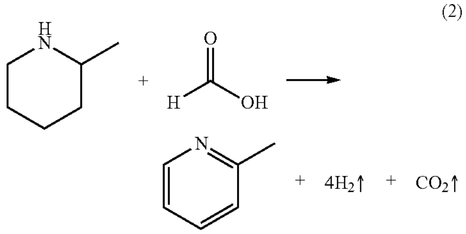

Referring to FIGS. 11 to 13, in Example 2-1, a hydrogen production amount of is 30 mmol, and dehydrogenation activity is 96.3%. In Example 2-2, a hydrogen production amount is 38.5 mmol, and dehydrogenation activity is 100%. In addition, Example 2-2 exhibits an improved hydrogen production amount at the initial reaction, compared with Example 2-1.

Figure 14:
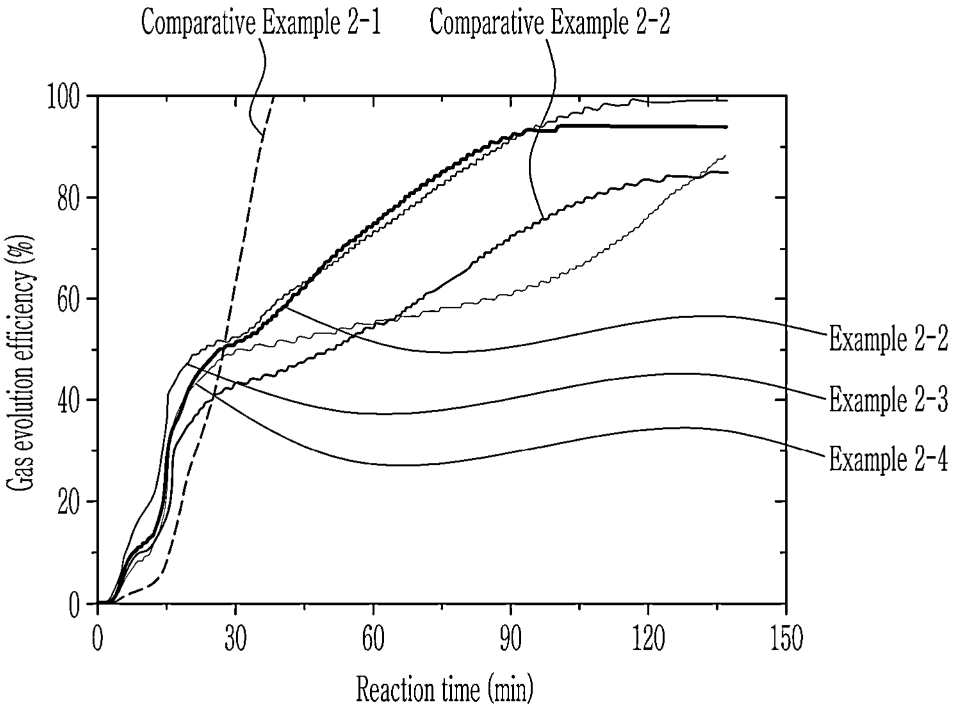
FIG. 14 is a graph showing the overall measurement results of the gas production efficiency of a mixture of methylpiperidine and formic acid according to the type of catalyst in Example 4.
Figure 15:
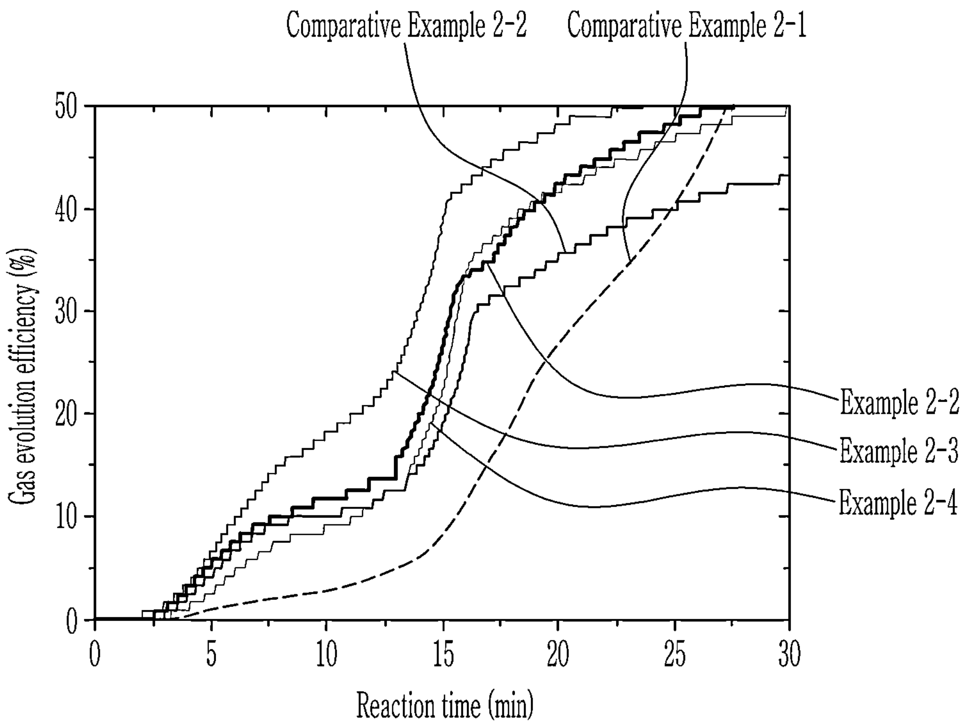
FIG. 15 is a graph showing the initial measurement results of the gas production efficiency of a mixture of methylpiperidine and formic acid according to the type of catalyst in Example 4.

Gas production efficiency of a mixture of methylpiperidine and formic acid according to the types of catalyst is measured, and the results are shown in FIG. 14, and the initial results are shown in FIG. 15.

A dehydrogenation reaction is carried by supplying 6 wt. % of a reactant at 51.5 g/L and changing a pressure at 200° C. in an amount of 1 mole of metal of a catalyst based on 100 moles of the reactant catalyst.

Example 2-2 uses a mixture of 10 mmol of 2-methylpiperidine and 10 mmol of formic acid as a reactant and $Pd/CeO_2—Al_2O_3$ (a content of Pd based on the total catalyst, a content of $CeO_2$ based on the total carrier: 20 wt. %) as a catalyst. Example 2-3 uses a mixture of 10 mmol of 2-methylpiperidine and 10 mmol of formic acid as a reactant and $Pd/SiO_2—Al_2O_3$ (a content of Pd based on the catalyst: 2 wt. %, a content of $SiO_2$ based on the total carrier: 1 wt. %) as a catalyst.

Example 2-4 uses a mixture of 10 mmol of 2-methylpiperidine and 10 mmol of formic acid as a reactant and $Pd/Pr_2O_3—Al_2O_3$ (a content of Pd based on the total catalyst, a content of $Pr_2O_3$ based on the total carrier: 20 wt. %) as a catalyst. Comparative Example 2-1 uses 10 mmol of 2-methylpiperidine as a reactant and $Pd/Al_2O_3$ (a content of Pd based on the total catalyst) as a catalyst. Comparative Example 2-2 uses a mixture of 10 mmol of 2-methylpiperidine and 10 mmol of formic acid as a reactant and $Pd/Al_2O_3$ (a content of Pd based on the total catalyst) as a catalyst.

In FIGS. 14 and 15, Example 2-2 exhibits gas production efficiency of 100%, Example 2-3 exhibits gas production efficiency of 98.3%, Example 2-4 exhibits gas production efficiency of 91.8%, and Comparative Example 2-2 exhibits gas production efficiency of 98.5%.

Referring to FIGS. 14 and 15, as a result of comparing dehydrogenation activity of a mixture of 2-methylpiperidine and formic acid according to types of a catalyst, Example 2-3 exhibits the most excellent entire reaction rate, initial reaction rate, and conversion rate.

Figure 16:
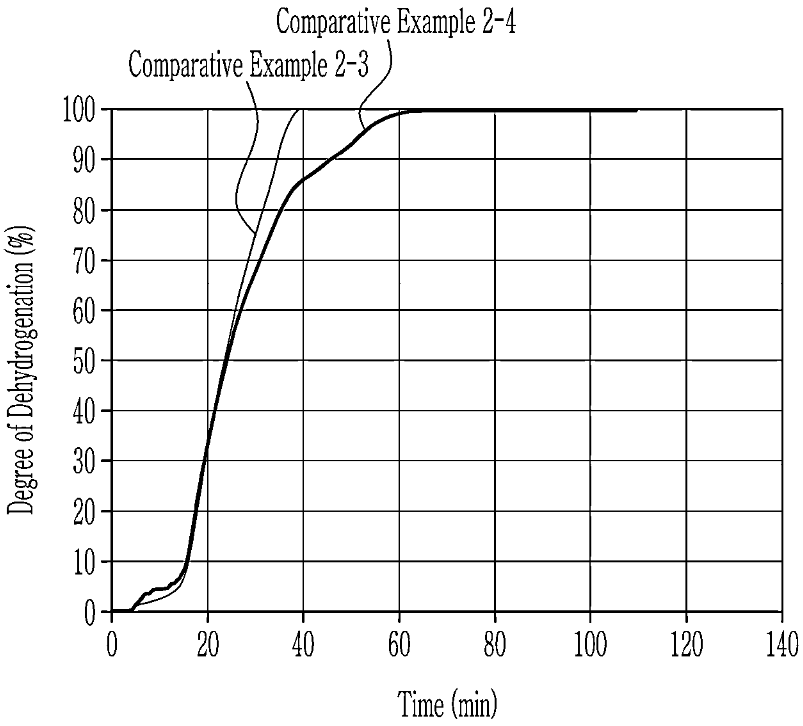
FIG. 16 is a graph showing the measurement results of the dehydrogenation activity of dimethylpiperidine before and after mixing formic acid in Example 4.

Dehydrogenation activity of dimethylpiperidine before and after mixing formic acid is measured, and the results are shown in FIG. 16.

A dehydrogenation reaction is carried out by supplying 5.3 wt. % of a reactant at 43.8 g/L at 200° C. under a pressure of 3 bar in an amount of 1 mole of metal of a catalyst based on 100 moles of the reactant catalyst.

Comparative Example 2-3 uses 10 mmol of 2,6-dimethylpiperidine as a reactant and $Pd/Al_2O_3$ (a content of Pd based on the total catalyst) as a catalyst. Comparative Example 2-4 uses a mixture of 10 mmol of 2,6-dimethylpiperidine and 10 mmol of formic acid as a reactant and $Pd/Al_2O_3$ (a content of Pd based on the total catalyst) as a catalyst.

In Comparative Example 2-3, the same reaction as in Reaction Scheme 3 proceeds, and 30 mmol of produced $H_2$ is 100% of a conversion rate. In Comparative Example 2-4, the same reaction as in Reaction Scheme 4 proceeds, and 40 mmol of produced $H_2$ is 100% of a conversion rate.

(3)

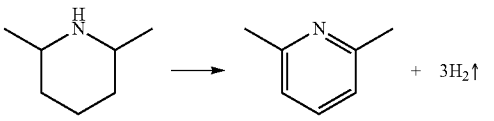

(4)

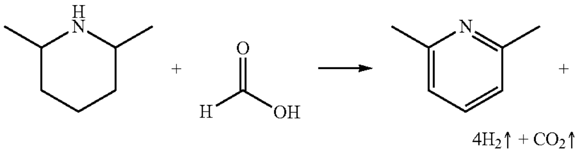

In FIG. 16, when 2,6-dimethylpiperidine and formic acid are mixed in a mole ratio of 1:1, a liquid is not maintained at room temperature but a solid salt is formed. When this mixture is dehydrogenated at 200° C. and under 3 bar, unlike the reaction results of 2-methylpiperidine and formic acid, in the beginning of temperature rise, a hydrogen production amount, a hydrogen production rate, and a conversion rate are shown at a similar level to those before mixing with formic acid. However, in the latter of the reaction, the hydrogen production rate is rather deteriorated.

Figure 17:
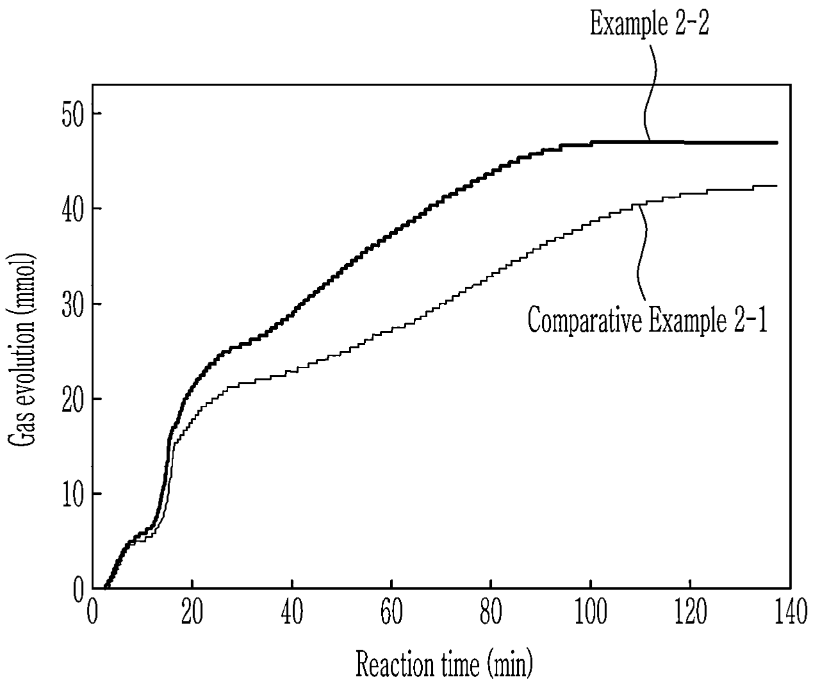
FIG. 17 is a graph showing the measurement results of the gas production amount of a mixture of methylpiperidine and formic acid according to the type of catalyst in Example 4.
Figure 18:
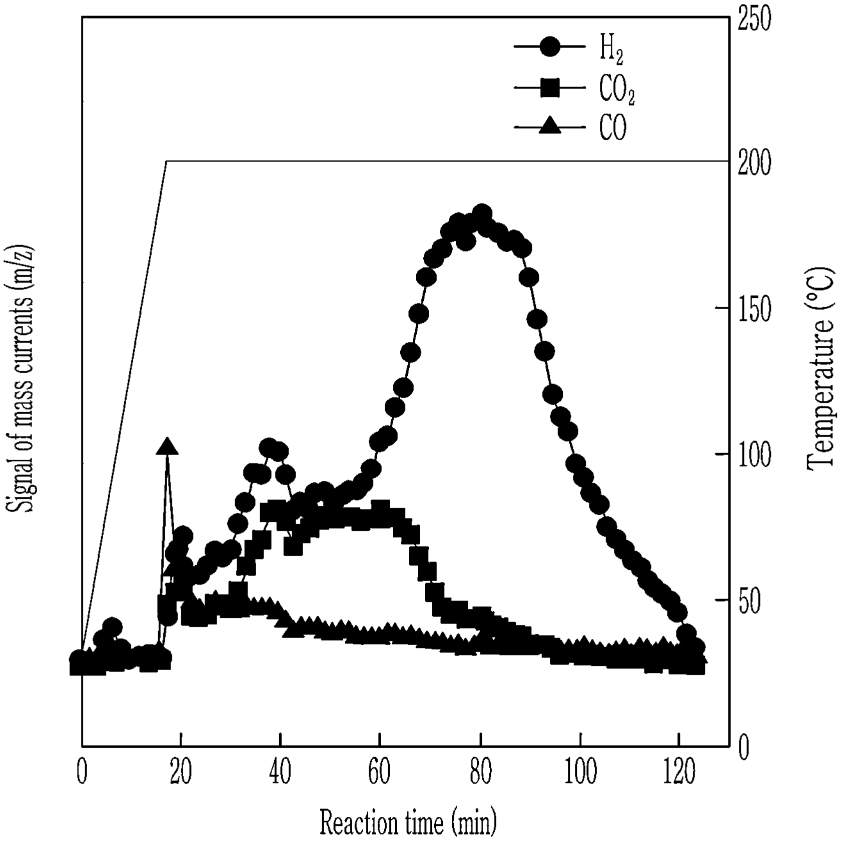
FIG. 18 is a graph showing the overall analysis results of the released gas of a mixture of methylpiperidine and formic acid according to the type of catalyst in Example 4.
Figure 19:
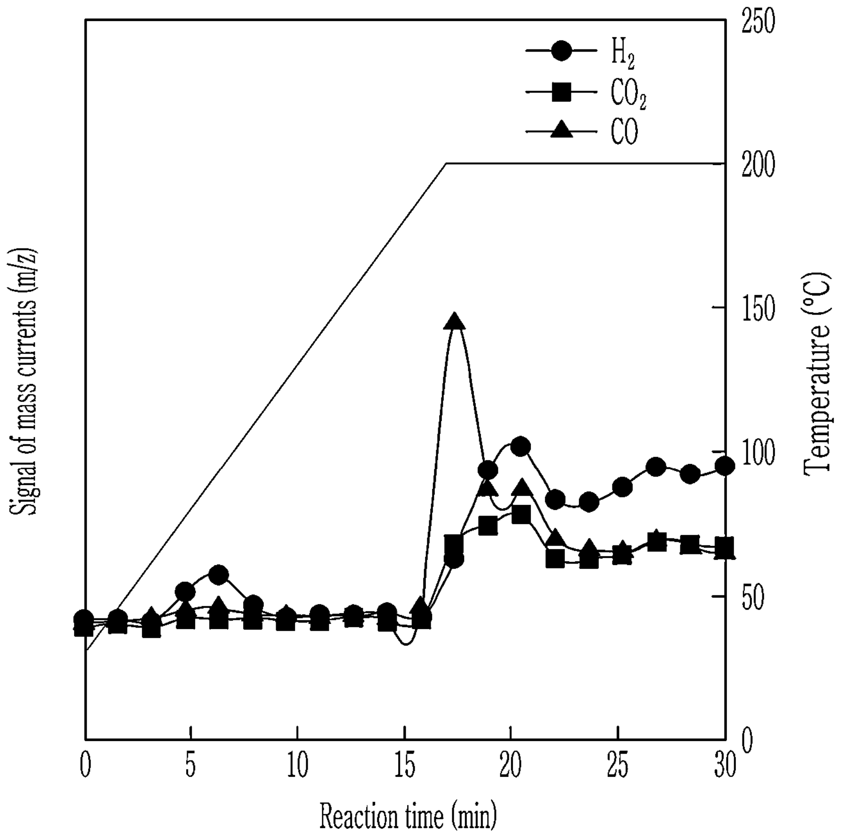
FIG. 19 is a graph showing the initial analysis result of the released gas of a mixture of methylpiperidine and formic acid according to the type of catalyst in Example 4.

Gas production amounts of a mixture of methylpiperidine and formic acid according to the type of catalyst are measured, and the results are shown in FIG. 17. Released gas of the mixture of methylpiperidine and formic acid according to the types of catalyst is analyzed, and the results are shown in FIG. 18, and the initial results are shown in FIG. 19.

A dehydrogenation reaction is carried out by supplying 6 wt. % of a reactant at 51.5 g/L and changing a pressure at 200° C. in an amount of 1 mole of metal of a catalyst based on 100 moles of the reactant catalyst.

Example 2-2 uses a mixture of 10 mmol of 2-methylpiperidine and 10 mmol of formic acid as a reactant and $Pd/CeO_2$—$Al_2O_3$ (a content of Pd based on the total catalyst, a content of $CeO_2$ based on the total carrier: 20 wt. %) as a catalyst. Comparative Example 2-1 uses 10 mmol of 2-methylpiperidine as a reactant and $Pd/Al_2O_3$ (a content of Pd based on the total catalyst) as a catalyst.

In FIG. 17, Example 2-2 exhibits a conversion rate of 96.3%, and Comparative Example 2-1 exhibits a conversion rate of 89.8%. Herein, 40 mmol of produced $H_2$ is 100% of a conversion rate.

Referring to FIGS. 17-19, the $Pd/Al_2O_3$ catalyst, compared with the $Pd/CeO_2$—$Al_2O_3$ catalyst, when used under the same reactants and the same reaction conditions, exhibits a very deteriorated hydrogen production rate, and a deteriorated conversion rate by 6.5%. In addition, as a result of the release gas analysis result, when the $Pd/Al_2O_3$ catalyst is used, formic acid is produced in a form of CO and $H_2O$ in the beginning of the reaction, and thereafter, CO is continuously produced, simultaneously with the $CO_2$ and $H_2$ decomposition reaction. In addition, the produced CO contaminates the catalyst surface, which is expected to reduce the hydrogen production rate.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

110: reactant tank
120: vaporizer
210: dehydrogenation reactor
220: product tank
230: heat source
300: hydrogen separator
400: buffer tank
500: fuel cell stack
610, 620: pump

What is claimed is:

1. A low-temperature dehydrogenation method, the method comprising:

conducting a dehydrogenation reaction of a reactant including a piperidine-based compound substituted with one or more alkyl groups to produce hydrogen, wherein the dehydrogenation reaction is conducted in a presence of a catalyst including an active metal supported on a carrier including a composite metal oxide, wherein the dehydrogenation reaction is conducted at a temperature in a range of 150° C. to 250° C., and wherein the piperidine-based compound is 2-methylpiperidine, the catalyst is $Pd/Pr_2O_3$—$Al_2O_3$, the carrier includes 1 wt. % to 50 wt. % of the composite metal oxide based on a total weight of the carrier, and the catalyst includes the active metal in a range of 0.1 wt. % to 5.0 wt. % based on a total weight of the catalyst.

2. The method of claim 1, wherein the catalyst comprises the active metal in a range of 0.3 moles to 10 moles based on 100 moles of the reactant.

3. The method of claim 1, further comprising:

mixing the piperidine-based compound and an acid prior to the conducting of the dehydrogenation reaction.

4. The method of claim 3, wherein the acid comprises sulfuric acid, nitric acid, phosphoric acid, hydrochloric acid, boric acid, heteropoly acid, acetic acid, formic acid, malic acid, citric acid, tartaric acid, ascorbic acid, lactic acid, oxalic acid, succinic acid, tauric acid, or a mixture thereof.

5. The method of claim 3, wherein the acid is mixed in a range of 0.001 moles to 1 mole based on 1 mole of the piperidine-based compound.

6. A low temperature dehydrogenation method, the method comprising:

conducting a dehydrogenation reaction of a reactant including a piperidine-based compound substituted with one or more alkyl groups to produce hydrogen, wherein the dehydrogenation reaction is conducted in a presence of a catalyst including an active metal supported on a carrier including a composite metal oxide, wherein the dehydrogenation reaction is conducted at a temperature in a range of 150° C. to 250° C., and wherein the piperidine-based compound is 2,6-dimethylpiperidine, wherein the catalyst is Pt/$CeO_2$—$Al_2O_3$, wherein the carrier comprises 1 wt. % to 50 wt. % of the composite metal oxide based on a total weight of the carrier, and wherein the catalyst comprises an active metal in a range of 1.0 wt. % to 5.0 wt. % based on a total weight of the catalyst.

7. A hydrogen production system comprising:

a reactant tank including a piperidine-based compound substituted with one or more alkyl groups; and a dehydrogenation reactor including a catalyst having an active metal supported on a carrier including a composite metal oxide, wherein the dehydrogenation reactor is configured to receive the piperidine-based compound from the reactant tank and perform a dehydrogenation reaction at a temperature in a range of 150° C. to 250° C. in a presence of the catalyst to produce hydrogen, wherein:

the piperidine-compound is 2-methylpiperidine, the catalyst is Pd/$Pr_2O_3$, the carrier includes 1 wt. % to 50 wt. % of the composite metal oxide based on a total weight of the carrier, and the catalyst includes the active metal in a range of 0.1 wt. % to 5.0 wt. % based on a total weight of the catalyst; or the piperidine-compound is 2,6-dimethylpiperidine, the catalyst is Pt/$CeO_2$—$Al_2O_3$, the carrier includes 1 wt. % to 50 wt. % of the composite metal oxide based on the total weight of the carrier, and the catalyst includes the active metal in a range of 1.0 wt. % to 5.0 wt. % based on the total weight of the catalyst.

8. The hydrogen production system of claim 7, wherein the piperidine-based compound stored in the reactant tank is configured to be injected into the dehydrogenation reactor in a liquid phase through an injector.

9. The hydrogen production system of claim 7, wherein the piperidine-based compound stored in the reactant tank is configured to be injected into the dehydrogenation reactor as a gas phase through a vaporizer.

10. The hydrogen production system of claim 7, further comprising:

an acid storage tank containing an acid.

11. The hydrogen production system of claim 7, further comprising:

a heat source configured to supply heat to the dehydrogenation reactor.

12. The hydrogen production system of claim 7, further comprising:

a buffer tank configured to store hydrogen produced from the dehydrogenation reactor.

13. The hydrogen production system of claim 7, further comprising:

a fuel cell stack configured to generate electricity and water by receiving hydrogen and oxygen produced in the dehydrogenation reactor.

* * * * *